US010501048B2

(12) United States Patent
Szawarski et al.

(10) Patent No.: US 10,501,048 B2
(45) Date of Patent: Dec. 10, 2019

(54) SEATBELT BUCKLING DETECTION (71) Applicant: Ford Global Technologies, LLC, Dearborn, MI (US)

(72) Inventors: Hubert Szawarski, Waterford, MI (US); Jialiang Le, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 168 days.

(21) Appl. No.: 15/875,411

(22) Filed: Jan. 19, 2018

(65) Prior Publication Data

US 2019/0225186 A1 Jul. 25, 2019

(51) Int. Cl.
*B60R 22/48* (2006.01)
*G06K 9/00* (2006.01)
*B60K 28/02* (2006.01)

(52) U.S. Cl.
CPC .............. *B60R 22/48* (2013.01); *B60K 28/02* (2013.01); *G06K 9/00838* (2013.01); *G06K 9/00845* (2013.01); *B60R 2022/485* (2013.01); *B60R 2022/4866* (2013.01)

(58) Field of Classification Search
CPC .............. B60R 22/48; B60R 2022/485; B60R 2022/4866; G06K 9/00838; G06K 9/00845; B60K 28/02
See application file for complete search history.

(56) References Cited

U.S. PATENT DOCUMENTS

| 6,480,616 | B1 * | 11/2002 | Hata | ...................... | B60N 2/002 |
| | | | | | 280/735 |
| 9,365,186 | B2 | 6/2016 | Gulash | | |
| 9,552,524 | B2 | 1/2017 | Artan et al. | | |
| 9,650,016 | B2 | 5/2017 | Andreen | | |
| 2005/0263992 | A1* | 12/2005 | Matsuda | ................. | G01S 5/163 |
| | | | | | 280/735 |
| 2006/0208169 | A1* | 9/2006 | Breed | ................... | B60N 2/002 |
| | | | | | 250/221 |
| 2006/0208189 | A1* | 9/2006 | Vilain | ...................... | G01J 5/20 |
| | | | | | 250/339.04 |
| 2007/0195990 | A1 | 8/2007 | Levy | | |
| 2016/0078306 | A1* | 3/2016 | Artan | .................... | B60R 22/48 |
| | | | | | 382/104 |

(Continued)

FOREIGN PATENT DOCUMENTS

CN 105373779 A 3/2016
CN 105488453 A 4/2016

(Continued)

OTHER PUBLICATIONS

Guo et al. "Image-based seat belt detection", Jul. 2011, https://www.researchgate.net/publication/252029744_Image-based_seat_belt_detection.

(Continued)

*Primary Examiner* — Darlene P Condra
(74) *Attorney, Agent, or Firm* — Frank A. MacKenzie; Bejin Bieneman PLC (57) ABSTRACT A computer is programmed to identify first and second regions of an image representing a seatbelt, actuate an output device to deliver a first output upon detecting an absence of the seatbelt in the first region and in the second region, and actuate the output device to deliver a second output upon detecting an absence of the seatbelt in the first region and a presence of the seatbelt in the second region.

20 Claims, 4 Drawing Sheets (56) References Cited

U.S. PATENT DOCUMENTS

| | | | | |
|---|---|---|---|---|
| 2016/0159320 A1* | 6/2016 | Andreen | ............... | B60R 22/48 |
| | | | | 382/103 |
| 2017/0144625 A1* | 5/2017 | Le | ........................ | B60R 22/48 |
| 2018/0326944 A1* | 11/2018 | Cech | .................... | G06K 9/2018 |
| 2019/0152418 A1* | 5/2019 | Coughlin | .......... | B60R 21/01548 |
| 2019/0152430 A1* | 5/2019 | Thomas | ................ | B60R 22/48 |
| 2019/0197326 A1* | 6/2019 | Ohno | .................... | B60R 22/48 |

FOREIGN PATENT DOCUMENTS

| | | |
|---|---|---|
| IN | 201641022646 A | 6/2016 |
| WO | 2012160251 A2 | 11/2012 |

OTHER PUBLICATIONS

Yu et al "Driver's Seat Belt Detection in Crossroad Based on Gradient Orientation", Proceeding ISCC-C '13 Proceedings of the 2013 International Conference on Information Science and Cloud Computer Companion, Dec. 7-8, 2013; IEEE Computer Society, Washington, D.C., https://dl.acm.org/citation.cfm?id=2665166.

* cited by examiner

SEATBELT BUCKLING DETECTION

BACKGROUND

A driver state monitoring (DSM) system detects whether an occupant in a driver seat of a vehicle is attentive or inattentive, such as drowsy. Some DSM systems receive input from an electric power steering system and analyze a steering pattern. Some DSM systems use lane-monitoring cameras to detect whether the vehicle is straying from a lane. Some DSM systems measure physiological data like heart rate or skin conductivity. Some DSM systems use a camera monitoring the occupant to, e.g., detect whether eyelids of the occupant are down too long or frequently.

Vehicles are typically equipped with sensors to detect whether seatbelts are buckled. These sensors are typically located in a buckle of a restraint system. For example, the vehicle may include reed switches inside each of the buckles to detect whether a clip of the seatbelt is buckled into the buckle.

But sensors located in the buckle cannot determine if the seatbelt is buckled, but buckled improperly. Furthermore, the sensors are an additional component and cost above the driver state monitoring system.

DETAILED DESCRIPTION

The system described herein can monitor for both unbuckled seatbelts and improperly buckled seatbelts. The system includes a camera for monitoring an occupant of a vehicle. The camera for monitoring the occupant can support both a driver state monitoring system and detection of seatbelt buckling, allowing a sensor in a buckle of the seatbelt to be omitted. The camera may also support other functionality such as lighting up dashboard controls based on a direction of the driver's gaze. Upon detecting an unbuckled seatbelt, the system can actuate one or more devices, including output devices and vehicle speed control(s), e.g., a throttle or transmission gearbox.

The system includes a computer, and the computer is programmed to identify first and second regions of a seatbelt image, actuate an output device to deliver a first output upon detecting an absence of a seatbelt in the first region and in the second region, and actuate the output device to deliver a second output upon detecting an absence of the seatbelt in the first region and a presence of the seatbelt in the second region.

The computer may be further programmed to actuate the output device to deliver the first output upon detecting an occupant in the image, an absence of the seatbelt in the first region, and an absence of the seatbelt in the second region; and actuate the output device to deliver the second output upon detecting the occupant in the image, an absence of the seatbelt in the first region, and a presence of the seatbelt in the second region.

The computer may be further programmed to select a location in the image for the first region at a chest of an occupant.

The computer may be further programmed to select a location in the image for the second region above a shoulder and beside a head or neck of an occupant.

The computer may be further programmed to actuate the output device to deliver a third output upon determining that an occupant is inattentive.

The first region may be located in the image where a chest of an occupant of 50th-percentile stature sitting in a seat is expected to be located.

The second region may be located in the image above where a shoulder and beside where a head or neck of an occupant of 50th-percentile stature sitting in the seat is expected to be located.

The first output may include a first actuation of a user interface and a limitation of vehicle speed, and the second output may include a second actuation of the user interface and a limitation of vehicle speed.

A method includes identifying first and second regions of a seatbelt image, actuating an output device to deliver a first output upon detecting an absence of a seatbelt in the first region and in the second region, and actuating the output device to deliver a second output upon detecting an absence of the seatbelt in the first region and a presence of the seatbelt in the second region.

The method may include actuating the output device to deliver the first output upon detecting an occupant in the image, an absence of the seatbelt in the first region, and an absence of the seatbelt in the second region; and actuating the output device to deliver the second output upon detecting the occupant in the image, an absence of the seatbelt in the first region, and a presence of the seatbelt in the second region.

The method may include selecting a location in the image for the first region at a chest of an occupant.

The method may include selecting a location in the image for the second region above a shoulder and beside a head or neck of an occupant.

The method may include actuating the output device to deliver a third output upon determining that an occupant is inattentive.

The first region may be located in the image where a chest of an occupant of 50th-percentile stature sitting in a seat is expected to be located.

The second region may be located in the image above where a shoulder and beside where a head or neck of an occupant of 50th-percentile stature sitting in the seat is expected to be located.

The first output may include a first actuation of a user interface and a limitation of vehicle speed, and the second output may include a second actuation of the user interface and a limitation of vehicle speed.

A vehicle includes a seat, a camera aimed at the seat, and a computer in communication with the camera, and the computer is programmed to identify first and second regions of a seatbelt image from the camera, actuate an output device to deliver a first output upon detecting an absence of a seatbelt in the first region and in the second region, and actuate the output device to deliver a second output upon detecting an absence of the seatbelt in the first region and a presence of the seatbelt in the second region.

The computer may be further programmed to select a location in the image for the first region at a chest of an occupant and to select a location in the image for the second region above a shoulder and beside a head or neck of the occupant.

The first region may be located in the image where a chest of an occupant of 50th-percentile stature sitting in the seat is expected to be located, and the second region may be located in the image above where a shoulder and beside where a head or neck of an occupant of 50th-percentile stature sitting in the seat is expected to be located.

The first output may include a first actuation of a user interface and a limitation of vehicle speed, and the second output may include a second actuation of the user interface and a limitation of vehicle speed.

Figure 1:
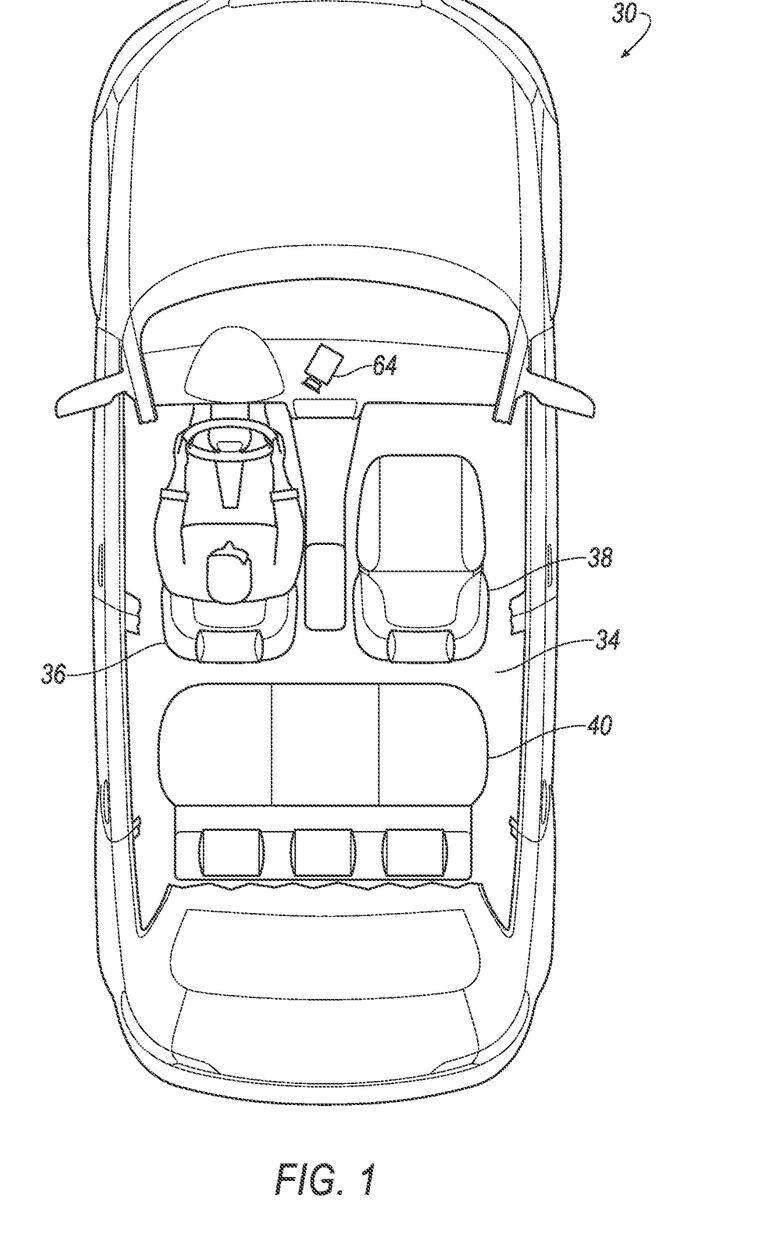
FIG. 1 is a top view of an example vehicle with a passenger cabin exposed for illustration.

With reference to FIG. 1, a vehicle 30 may be an autonomous vehicle. A computer 32 (shown in FIG. 3) can be configured to operate the vehicle 30 independently of the intervention of a human driver, completely or to a lesser degree. The computer 32 may be programmed to operate the propulsion, brake system, steering, and/or other vehicle systems. For the purposes of this disclosure, autonomous operation means the computer 32 controls the propulsion, brake system, and steering; semi-autonomous operation means the computer 32 controls one or two of the propulsion, brake system, and steering, and a human driver controls the remainder; and nonautonomous operation means the human driver controls the propulsion, brake system, and steering.

The vehicle 30 includes a passenger cabin 34 that can house occupants, if any, of the vehicle 30. The passenger cabin 34 includes one or more front seats 36, 38, including a driver seat 36 and a passenger seat 38, disposed at a front of the passenger cabin 34. The cabin can further include one or more back seats 40 disposed behind the front seats 36, 38. The passenger cabin 34 may also include third-row seats (not shown) at a rear of the passenger cabin 34. In FIG. 1, the front seats 36, 38 are shown as bucket seats, but the seats 36, 38, 40 may be other types. The position and orientation of the seats 36, 38, 40 and components thereof may be adjustable by an occupant.

Figure 4A:
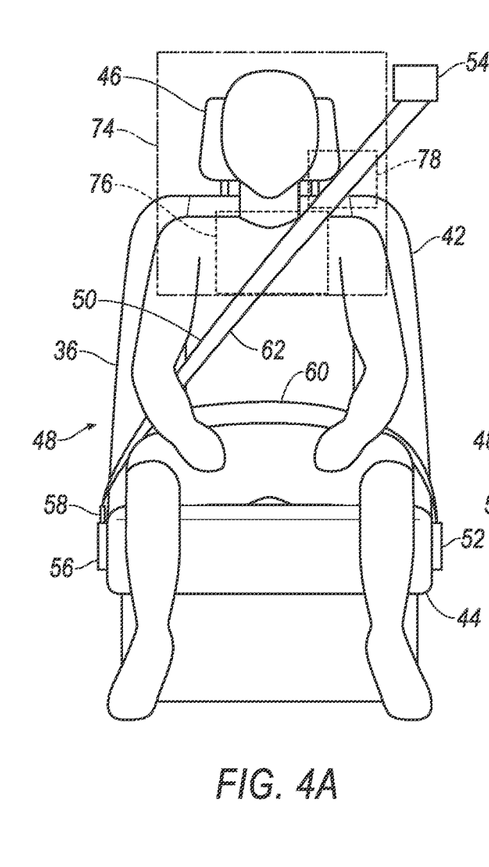
FIG. 4A a front view of a seat of the vehicle of FIG. 1 having an occupant with a seatbelt in a first arrangement.
Figure 4B:
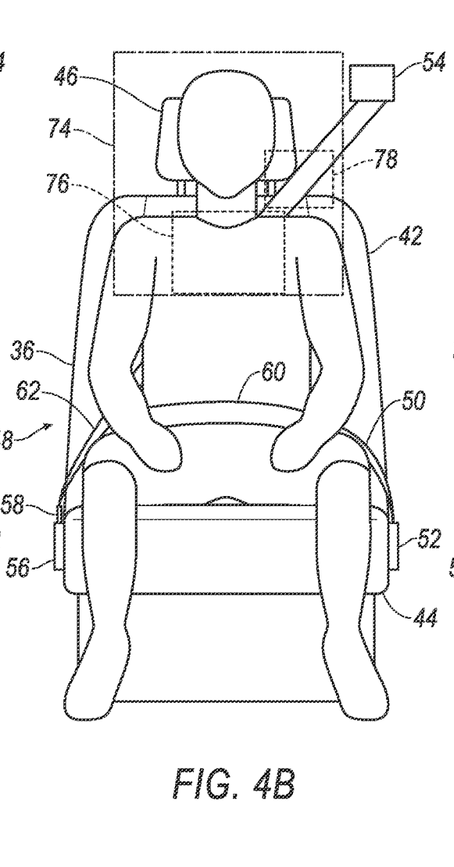
FIG. 4B a front view of the seat of the vehicle of FIG. 1 having an occupant with the seatbelt in a second arrangement.
Figure 4C:
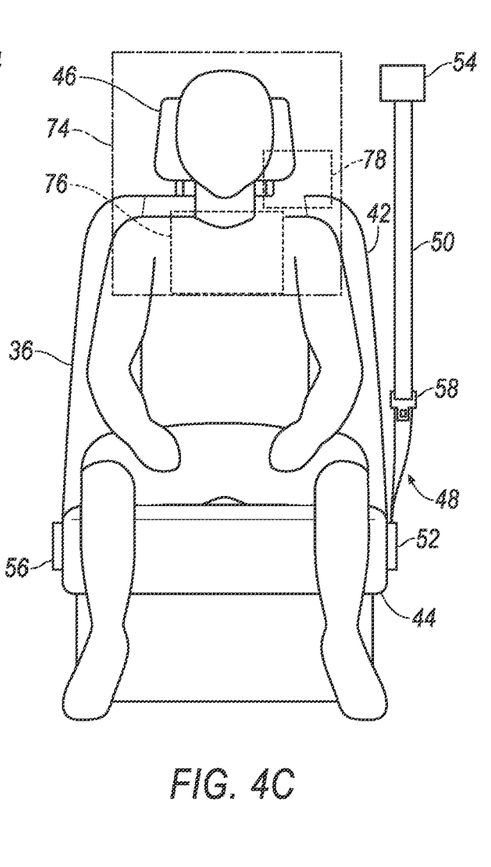
FIG. 4C a front view of the seat of the vehicle of FIG. 1 having an occupant with the seatbelt in a third arrangement.

With reference to FIGS. 4A-C, each seat 36, 38, 40 may include a seatback 42, a seat bottom 44, and a headrest 46. The headrest 46 may be supported by the seatback 42 and may be stationary or movable relative to the seatback 42. The seatback 42 may be supported by the seat bottom 44 and may be stationary or movable relative to the seat bottom 44. The seatback 42, the seat bottom 44, and/or the headrest 46 may be adjustable in multiple degrees of freedom. Specifically, the seatback 42, the seat bottom 44, and/or the headrest 46 may themselves be adjustable, in other words, adjustable components within the seatback 42, the seat bottom 44, and/or the headrest 46 and/or may be adjustable relative to each other.

Each seat 36, 38, 40 has a restraint system 48. The restraint system 48 is a three-point harness, meaning that a seatbelt 50 is attached at three points around the occupant when fastened: an anchor 52, a retractor 54, and a buckle 56. The restraint system 48 may, alternatively, include another number and/or arrangement of attachment points.

The anchor 52 attaches one end of the seatbelt 50 to a frame (not shown) of the seat 36, 38, 40 in a conventional manner. The other end of the seatbelt 50 feeds into the retractor 54, which may include a conventional spool (not shown) that extends and retracts the seatbelt 50. A clip 58 slides freely along the seatbelt 50 and, when engaged with the buckle 56, divides the seatbelt 50 into a lap band 60 and a shoulder band 62.

Figure 2:
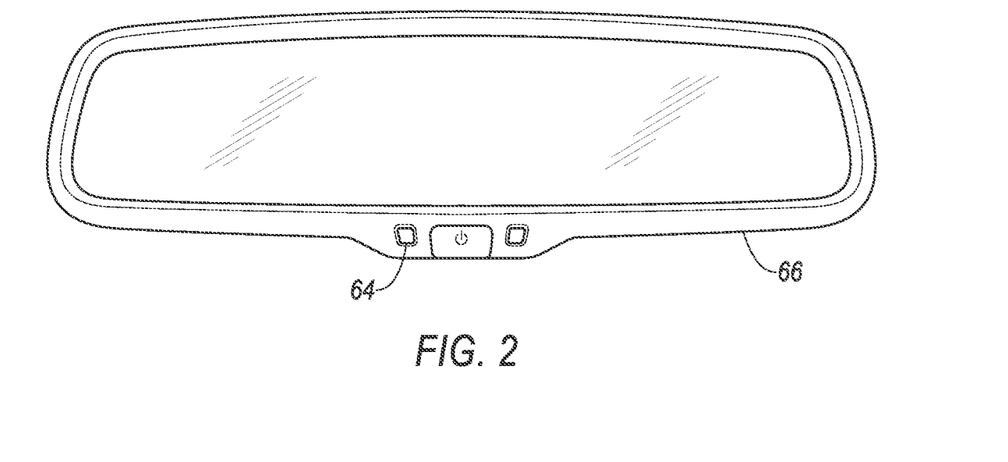
FIG. 2 is a rear view of a rear-view mirror of the vehicle of FIG. 1.

With reference to FIGS. 1 and 2, a camera 64 is aimed at, i.e., are arranged to have a field of view including, one or more of the seats 36, 38, 40. Specifically, the camera 64 may be aimed at the seat 36, 38, 40, e.g., at the seatback 42 of the driver seat 36. For example, the camera 64 may be fixedly mounted in a position in which the seatback 42 is in a field of view of the camera 64 regardless of how a position of the seat 36, 38, 40 is adjusted. For another example, the camera 64 may be movably mounted, e.g., by servomotors (not shown), and movement of the camera 64 may track adjustment of the position of the seat 36, 38, 40. The camera 64 is attached in the passenger cabin 34. For example, the camera 64 may be attached to a rear-view mirror 66 and face rearward. For another example, the camera 64 may be mounted on or in an instrument panel, such as behind a steering wheel or centered on the instrument panel near a bottom edge of a windshield. For another example, the camera 64 may be mounted to a ceiling of the passenger cabin 34, e.g., near a sun visor. The camera 64 outputs data in the form of video, i.e., a temporal sequence of images, e.g., digital images. The camera 64 detects electromagnetic radiation; for example, the camera 64 may detect some or all of the visible-light spectrum and, alternatively or additionally, may detect some or all of the infrared and/or ultraviolet spectrum.

Figure 3:
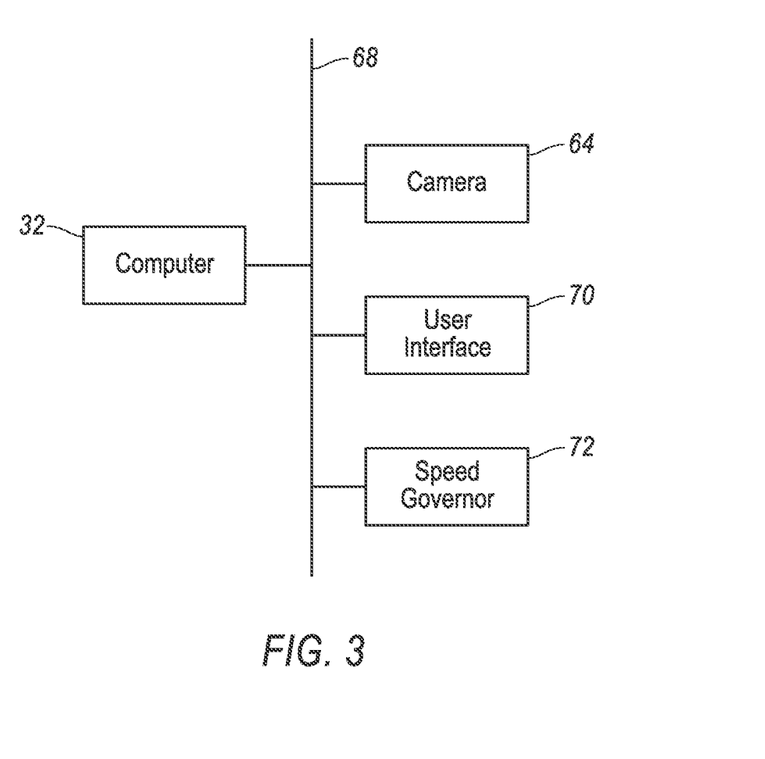
FIG. 3 is a block diagram of a control system of the vehicle of FIG. 1.

With reference to FIG. 3, the computer 32 is a microprocessor-based computer. The computer 32 includes a processor, memory, etc. The memory of the computer 32 includes memory for storing instructions executable by the processor as well as for electronically storing data and/or databases.

The computer 32 may transmit and receive data through a communications network 68 such as a controller area network (CAN) bus, Ethernet, WiFi, Local Interconnect Network (LIN), onboard diagnostics connector (OBD-II), and/or by any other wired or wireless communications network. The computer 32 may be in communication with the camera 64, a user interface 70, a speed governor 72, and other components via the communications network 68.

The user interface 70 presents information to and receives information from an occupant of the vehicle 30. The user interface 70 may be located, e.g., on an instrument panel in a passenger cabin 34 of the vehicle 30, or wherever may be readily seen by the occupant. The user interface 70 may include dials, digital readouts, screens, speakers, and so on for providing information to the occupant, e.g., human-machine interface (HMI) elements such as are known. The user interface 70 may include buttons, knobs, keypads, microphone, and so on for receiving information from the occupant.

The speed governor 72 limits a speed of the vehicle 30 to a maximum speed. The maximum speed may be a positive number or zero, and the maximum speed is measured in units of velocity, e.g., miles per hour. The speed governor 72 may be implemented as programming in the computer 32 that overrides other inputs or programming that would increase an engine speed of an engine of the vehicle 30 above the engine speed corresponding with the maximum speed. The engine speed is measured in cycles per time, e.g., revolutions per minute. Alternatively, the speed governor 72 may be implemented as programming in the computer 32 that prevents the vehicle 30 from shifting higher than a particular gear, e.g., park or first gear, thus capping the speed of the vehicle 30 to the maximum speed achievable in that particular gear. Alternatively or additionally, the speed governor 72 may prohibit a transmission gearbox from functioning by preventing the driver from shifting out of Park.

Figure 5:
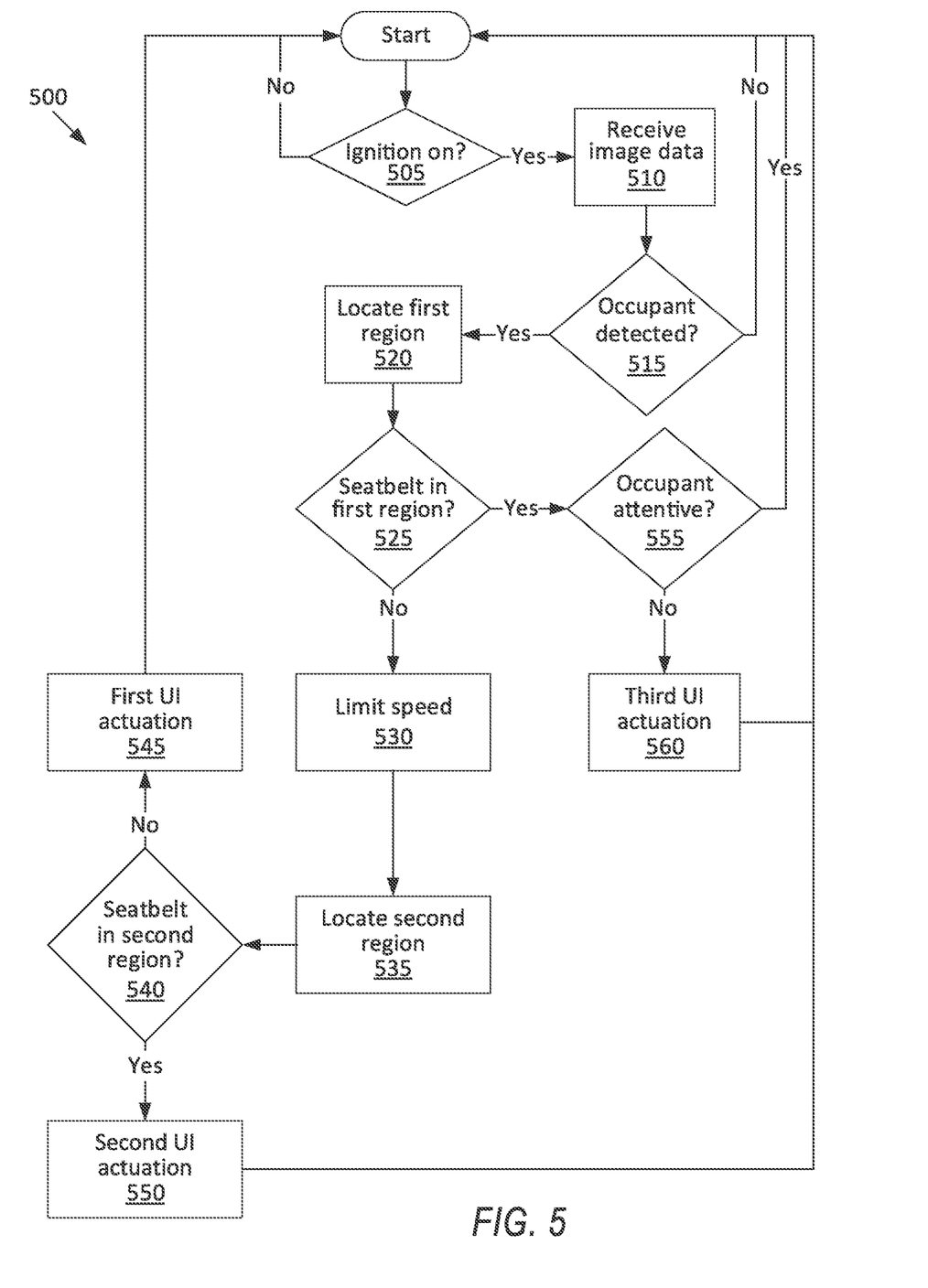
FIG. 5 is a process flow diagram of an example process for controlling the vehicle of FIG. 1 based on the arrangement of the seatbelt.

FIG. 5 is a process flow diagram illustrating an exemplary process 500 for controlling the vehicle 30 based on whether and/or how the restraint system 48 has been buckled. In general, according to the process 500, the computer 32 can provide a first output when the restraint system 48 is unbuckled and/or can provide a second output when the restraint system 48 is buckled improperly with the shoulder band 62 behind the occupant. The first output may include a first actuation of the user interface 70, e.g., with a message to buckle a belt, and a limitation of speed to a maximum speed, and the second output may include a second actuation of the user interface 70 different from the first actuation, and a limitation of speed to the maximum speed. The memory of the computer 32 stores executable instructions for performing the steps of the process 500.

The process 500 begins in a block 505, in which the computer 32 determines whether an ignition is on, in other words, whether the engine or motor of the vehicle 30 is running. If the ignition is off, the process 500 restarts to continue monitoring for use of the seatbelt 50.

If the ignition is on, next, in a block 510, the computer 32 receives image data from the camera 64. The data is in the form of an image 74 in a sequence of images outputted by the camera 64.

Next, in a decision block 515, the computer 32 detects whether an occupant is in the image 74. The computer 32 may perform a conventional object-recognition algorithm on the data from the camera 64 to recognize an object, e.g., the upper torso and/or head and/or face of the occupant sitting in the driver seat 36. (The process 500 is described with respect to the driver seat 36 but may be applied to any or all of the seats 36, 38, 40.) For example, the computer 32 may apply edge detection using grayscale gradients to the image 74. The grayscale gradient may be a difference in brightness between two pixels divided by the distance between the pixels. The computer 32 may determine a location for an edge, e.g., wherever the grayscale gradient is above an edge threshold. Like the grayscale gradient, the edge threshold may be measured in brightness per pixel distance. The memory of the computer 32 may store shapes representing the objects to be detected, e.g., torso, head, etc., along with corresponding sizes, measured in pixels or in physical distance, e.g., inches. For example, the stored shape of a head may be a vertically oriented oval 9 inches tall and 6 inches wide. Subsets of the detected edges may be compared with the stored shapes and scored according to how closely the detected edges match the stored shapes. If the score of a subset of detected edges is above a detection threshold, then the subset of detected edges is classified as an instance of the stored shape, e.g., as an instance of the head. If a body part such as the head is detected in the image 74, then the computer 32 concludes that an occupant is in the image 74. If an occupant is not detected in the driver seat 36, the process 500 restarts to continue monitoring the restraint system 48.

If an occupant is detected in the driver seat 36, next, in a block 520, the computer 32 locates the first region 76. The computer 32 identifies the first region 76 in the image 74, as shown in FIGS. 4A-C. The first region 76 is chosen to correspond to a location of a chest of an occupant of the driver seat 36. For example, the computer 32 may select a location in the image 74 for the first region 76 at a chest of the occupant that the computer 32 detected above in the decision block 515. If the computer 32 detected the head of the occupant, then the computer 32 may horizontally align a center of the first region 76 with a center of the detected head, and the computer 32 may set a top edge of the first region 76 at a vertical offset down from a bottom point of the detected head. The vertical offset may be a scalar value measured in, e.g., pixels or inches and stored in the memory of the computer 32. The vertical offset may be chosen to be, e.g., an average vertical distance between a chin and a sternum. Alternatively, the vertical offset may be a variable that changes with a vertical distance between, e.g., a top point of the head of the occupant and a top of the image 74. Accordingly, the vertical offset may be stored in the memory of the computer 32 as a relationship with the vertical distance from the top point of the head to the top of the image 74, e.g., as a lookup table with columns for the vertical distance from the top point of the head to the top of the image 74 and for the vertical offset.

| Vertical distance from top point of head to top of image (pixels) | Vertical offset (pixels) |
|---|---|
| 10 | 30 |
| 12 | 27 |
| 14 | 24 |
| ... | ... |

Regardless of whether the vertical offset is a scalar constant or a variable, the first region 76 will be located higher in the image 74 for a taller than for a shorter occupant. Once determined, the location of the first region 76 may be stored in the memory of the computer 32 as pixel coordinates in the image 74, e.g., a number of pixels to the right and a number of pixels down from an upper left corner of the image 74. Alternatively, for another example, the first region 76 may be located in the image 74 where a chest of an occupant of 50th-percentile stature sitting in the driver seat 36 is expected to be located. For this alternative, the location of the first region 76 may be prestored in the memory of the computer 32 as pixel coordinates in the image 74.

Next, in a decision block 525, the computer 32 detects whether the seatbelt 50 is present or absent from a first region 76 of the image 74. The computer 32 may perform a conventional object-recognition algorithm on the first region 76 of the image 74 to recognize an object, e.g., the shoulder band 62. For example, the computer 32 may apply edge detection using grayscale gradients to the image 74. The computer 32 may determine a location for an edge within the first region 76, e.g., wherever the grayscale gradient is above the edge threshold. The memory of the computer 32 may store shapes representing the objects to the detected, e.g., the shoulder band 62, along with corresponding sizes, measured in pixels or in physical distance, e.g., inches. For example, the stored shape of the shoulder band 62 may be two parallel lines 3 inches apart at an angle of 45°. Subsets of the detected edges may be compared with the stored shape and scored according to how closely the detected edges match the stored shape. If the score of a subset of detected edges is above a detection threshold, then the subset of detected edges is classified as an instance of the stored shape, e.g., as an instance of the shoulder band 62. If the presence of the seatbelt 50 is detected in the first region 76, as shown in FIG. 4A, the process 500 proceeds to a block 555.

If an absence of the seatbelt 50 is detected in the first region 76 (as shown in FIGS. 4B and 4C), next, in a block 530, the computer 32 actuates an output device to deliver an output including a limitation of vehicle speed. The limitation of speed is a component of both the first and second outputs. The output device may include the speed governor 72. The computer 32 may instruct the speed governor 72 to limit the vehicle speed to a maximum speed or limit the gear to a maximum gear. The maximum speed may be chosen to be lower than a typical street driving speed. The maximum speed may be zero, or the maximum speed may be lower than typical speed limits but sufficiently high for other driving, e.g., on an occupant's driveway. Alternatively, the maximum gear may be chosen to prevent the vehicle 30 from shifting above park or above first gear, for example.

Next, in a block 535, the computer 32 locates the second region 78. The computer 32 identifies the second region 78 in the image 74, as shown in FIG. 4A-C. The second region 78 is chosen to correspond to a location above a shoulder and beside a head or neck of an occupant of the driver seat 36. For example, the computer 32 may select a location in the image 74 for the second region 78 above a shoulder and beside a head or neck of the occupant that the computer 32 detected above in the decision block 515. If the computer 32 detected the head of the occupant, then the computer 32 may vertically align a center of the second region 78 with a center of the detected head, and the computer 32 may set a left edge of the second region 78 at a horizontal offset to the right from a rightmost point of the detected head. The horizontal offset may be a scalar value measured in, e.g., pixels or inches and stored in the memory of the computer 32. The horizontal offset may be chosen to be, e.g., an average horizontal distance from an end of a mandible to an outside end of a clavicle. Alternatively, the horizontal offset may be a variable that changes with the vertical distance between, e.g., the top point of the head of the occupant and the top of the image 74. Accordingly, the horizontal offset may be stored in the memory of the computer 32 as a relationship with the vertical distance from the top point of the head to the top of the image 74, e.g., as a lookup table with columns for the vertical distance from the top point of the head to the top of the image 74 and for the horizontal offset.

| Vertical distance from top point of head to top of image (pixels) | Horizontal offset (pixels) |
|---|---|
| 10 | 50 |
| 12 | 47 |
| 14 | 44 |
| ... | ... |

Once determined, the location of the second region 78 may be stored in the memory of the computer 32 as pixel coordinates in the image 74. Alternatively, for another example, the second region 78 may be located in the image 74 above where a shoulder and beside where a head or neck of an occupant of 50th-percentile stature sitting in the driver seat 36 is expected to be located. For this alternative, the location of the second region 78 may be prestored in the memory as pixel coordinates in the image 74.

Next, in a decision block 540, the computer 32 detects whether the seatbelt 50 is present or absent from a second region 78 of the image 74. The computer 32 may perform a conventional object-recognition algorithm on the second region 78 of the image 74 to recognize an object, e.g., the shoulder band 62, as described above with respect to the decision block 515. If the presence of the seatbelt 50 is detected in the second region 78, as shown in FIG. 4B, the process 500 proceeds to a block 550.

If an absence of the seatbelt 50 is detected in the second region 78 (as shown in FIG. 4C), next, in a block 545, the computer 32 actuates an output device to deliver the first actuation of the user interface 70. The first actuation is a component of the first output. The output device includes the user interface 70. The first actuation of the user interface 70 may communicate a message to the occupant that the seatbelt 50 is not buckled or that the occupant should buckle the seatbelt 50. The first actuation of the user interface 70 may include illuminating a light on an instrument panel or displaying text on a screen along with a noise such as a beep. After the block 545, the process 500 restarts to continue monitoring for use of the seatbelt 50.

If the presence of the seatbelt 50 is detected in the second region 78 (as shown in FIG. 4B), after the decision block 540, in the block 550, the computer 32 actuates an output device to deliver the second actuation of the user interface 70. The second actuation is a component of the second output. The output device includes the user interface 70. The second actuation of the user interface 70 may communicate a message to the occupant that the seatbelt 50 is buckled improperly or that the occupant should re-buckle the seatbelt 50 with the shoulder band 62 in front of the torso of the occupant. The second actuation of the user interface 70 may include illuminating a light on an instrument panel or displaying text on a screen along with a noise such as a beep. After the block 550, the process 500 restarts to continue monitoring for use of the seatbelt 50.

After the decision block 525, if the presence of the seatbelt 50 is detected in the first region 76 (as shown in FIG. 4A), in the decision block 555, the computer 32 determines whether the occupant is attentive, e.g., using a conventional technique. For example, attentiveness determination could include the computer 32 determining whether a face of the occupant is oriented forward relative to the vehicle 30, e.g., not tilted back or down. The computer 32 may perform a conventional object-recognition algorithm, e.g., as described above with respect to the decision block 515, on the data from the camera 64 to recognize an object, e.g., the face of the occupant in a forward-facing orientation or in a downward- or upward-facing orientation. Detecting a face of the occupant in a forward-facing orientation is classified as attentive, and detecting a face in a downward- or upward-facing orientation is classified as inattentive. If the occupant is attentive, the process 500 restarts to continue monitoring for use of the seatbelt 50.

If the occupant is inattentive, next, in a block 560, the computer 32 actuates an output device to deliver a third output that includes a third actuation of the user interface 70. The output device includes the user interface 70. The third actuation of the user interface 70 may alert the occupant to pay closer attention to the driving task. The third actuation of the user interface 70 may include illuminating a light on an instrument panel or displaying text on a screen along with a noise such as a beep. The third output may also include, e.g., braking the vehicle 30. After the block 560, the process 500 restarts to continue monitoring for use of the seatbelt 50.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising a computer, the computer programmed to:
    identify first and second regions of a seatbelt image;
    actuate an output device to deliver a first output upon detecting an absence of a seatbelt in the first region and in the second region; and
    actuate the output device to deliver a second output upon detecting an absence of the seatbelt in the first region and a presence of the seatbelt in the second region.

2. The system of claim 1, the computer further programmed to:
actuate the output device to deliver the first output upon detecting an occupant in the image, an absence of the seatbelt in the first region, and an absence of the seatbelt in the second region; and
actuate the output device to deliver the second output upon detecting the occupant in the image, an absence of the seatbelt in the first region, and a presence of the seatbelt in the second region.

3. The system of claim 1, the computer further programmed to select a location in the image for the first region at a chest of an occupant.

4. The system of claim 1, the computer further programmed to select a location in the image for the second region above a shoulder and beside a head or neck of an occupant.

5. The system of claim 1, the computer further programmed to actuate the output device to deliver a third output upon determining that an occupant is inattentive.

6. The system of claim 1, wherein the first region is located in the image where a chest of an occupant of 50th-percentile stature sitting in a seat is expected to be located.

7. The system of claim 1, wherein the second region is located in the image above where a shoulder and beside where a head or neck of an occupant of 50th-percentile stature sitting in the seat is expected to be located.

8. The system of claim 1, wherein the first output includes a first actuation of a user interface and a limitation of vehicle speed, and the second output includes a second actuation of the user interface and a limitation of vehicle speed.

9. A method comprising:
identifying first and second regions of a seatbelt image;
actuating an output device to deliver a first output upon detecting an absence of a seatbelt in the first region and in the second region; and
actuating the output device to deliver a second output upon detecting an absence of the seatbelt in the first region and a presence of the seatbelt in the second region.

10. The method of claim 9, further comprising:
actuating the output device to deliver the first output upon detecting an occupant in the image, an absence of the seatbelt in the first region, and an absence of the seatbelt in the second region; and
actuating the output device to deliver the second output upon detecting the occupant in the image, an absence of the seatbelt in the first region, and a presence of the seatbelt in the second region.

11. The method of claim 9, further comprising selecting a location in the image for the first region at a chest of an occupant.

12. The method of claim 9, further comprising selecting a location in the image for the second region above a shoulder and beside a head or neck of an occupant.

13. The method of claim 9, further comprising actuating the output device to deliver a third output upon determining that an occupant is inattentive.

14. The method of claim 9, wherein the first region is located in the image where a chest of an occupant of 50th-percentile stature sitting in a seat is expected to be located.

15. The method of claim 9, wherein the second region is located in the image above where a shoulder and beside where a head or neck of an occupant of 50th-percentile stature sitting in the seat is expected to be located.

16. The method of claim 9, wherein the first output includes a first actuation of a user interface and a limitation of vehicle speed, and the second output includes a second actuation of the user interface and a limitation of vehicle speed.

17. A vehicle comprising:
a seat;
a camera aimed at the seat; and
a computer in communication with the camera and programmed to
identify first and second regions of a seatbelt image from the camera;
actuate an output device to deliver a first output upon detecting an absence of a seatbelt in the first region and in the second region; and
actuate the output device to deliver a second output upon detecting an absence of the seatbelt in the first region and a presence of the seatbelt in the second region.

18. The vehicle of claim 17, wherein the computer is further programmed to select a location in the image for the first region at a chest of an occupant and to select a location in the image for the second region above a shoulder and beside a head or neck of the occupant.

19. The vehicle of claim 17, wherein the first region is located in the image where a chest of an occupant of 50th-percentile stature sitting in the seat is expected to be located, and the second region is located in the image above where a shoulder and beside where a head or neck of an occupant of 50th-percentile stature sitting in the seat is expected to be located.

20. The vehicle of claim 17, wherein the first output includes a first actuation of a user interface and a limitation of vehicle speed, and the second output includes a second actuation of the user interface and a limitation of vehicle speed.

* * * * *